(12) United States Patent
Ko et al.

(10) Patent No.: US 6,519,812 B2
(45) Date of Patent: Feb. 18, 2003

(54) HINGE STRUCTURE

(75) Inventors: Yu-Chen Ko, Taipei (TW); Heem-Hoe Chee, Penang (MY)

(73) Assignee: Inventec Multimedia & Telecom Corporation, Taipei (TW)

(*) Notice: Subject to any disclaimer, the term of this patent is extended or adjusted under 35 U.S.C. 154(b) by 0 days.

(21) Appl. No.: 09/893,614

(22) Filed: Jun. 29, 2001

(65) Prior Publication Data

US 2002/0038493 A1 Apr. 4, 2002

(30) Foreign Application Priority Data

Oct. 4, 2000 (TW) ..................................... 89217189 U (51) Int. Cl.[7] .............................................. E05D 7/00
(52) U.S. Cl. ............................ 16/354; 16/334; 16/335; 16/366; 16/361; 16/681; 16/683; 16/248; 16/919
(58) Field of Search ......................... 16/354, 334, 335, 16/336, 366; 361/680, 681, 682, 683; 248/919, 920, 921, 922, 923; 74/421 R, 393

(56) References Cited

U.S. PATENT DOCUMENTS

| | | | | |
|---|---|---|---|---|
| 2,206,739 A | * | 7/1940 | Brogren et al. | 16/164 |
| 3,422,487 A | * | 1/1969 | Dickenson et al. | 16/163 |
| 4,207,777 A | * | 6/1980 | Fluehmann | 74/462 |
| 4,614,454 A | * | 9/1986 | Kassai | 403/62 |
| 4,765,027 A | * | 8/1988 | Andric | 16/354 |
| 5,241,716 A | * | 9/1993 | Kohus | 5/99.1 |
| 5,987,704 A | * | 11/1999 | Tang | 16/354 |
| 6,186,018 B1 | * | 2/2001 | Ichikawa | 74/384 |
| 6,191,937 B1 | * | 2/2001 | Bang | 361/681 |

FOREIGN PATENT DOCUMENTS

GB     2220030 A   *  6/1988  ........... E05D/11/10

* cited by examiner

Primary Examiner—Anthony Knight
Assistant Examiner—Lisa Bannapradist
(74) Attorney, Agent, or Firm—Birch, Stewart, Kolasch & Birch, LLP (57) ABSTRACT

A hinge structure for use in an electronic device such as a digital camera for connecting two elements and making the two elements turn against each other. A gear unit is provided, which has two gears engaging with each other and turning in opposite directions. The two gears connect respectively with the two elements. When one element is turned in one direction, through the transmission of the gear unit, another element will be driven to turn in the opposite direction, to thereby change the angle between the two elements and enhance picture taking flexibility.

15 Claims, 11 Drawing Sheets

HINGE STRUCTURE

FIELD OF THE INVENTION

This invention relates to a hinge structure for electronic devices consisting of two elements such as digital cameras, and particularly for connecting a camera body and a display panel to allow the camera body and the display panel to turn or fold and stack upon each other.

BACKGROUND OF THE INVENTION

Digital cameras, also called Digital Still Cameras (DSC) to distinguish them from digital video cameras, use digitized data to store the captured still images. They use magnetic disks or PCMCIA (Personal Computer Memory Card International Association) memory cards to store the static images. In order to save the medium space, the captured images of the digital camera are usually stored in compression files. The most commonly used file format is JPEG (Joint Photographic Experts Group). The captured pictures may be input into a computer through a RS-232 (Recommended Standard-232) communication port for image processing, or be printed out at a printer through a printer port. There is no need for the developing process, as with conventional cameras. They also do not need film. Hence, they are desirable for journalists who are always under time constraints in their work. The captured images may be stored directly and transmitted by electronic mail to the newspaper office.

The presently available digital cameras still have a lower resolution than conventional cameras. Especially when taking pictures in weak lighting, digital cameras cannot match conventional cameras in picture clarity. Nevertheless, digital cameras generally have a Liquid Crystal Display (LCD) which enables users to see the captured images immediately, and the captured images may be deleted through the display screen. This is a function not available or possible for conventional cameras.

Most digital cameras have the LCD mounted on the camera body. Such a construction has shortcomings. For instance, there is no protection for the fragile LCD and lens unit. Hence, additional protection masks or the like have to be provided for this purpose. There is also no self-picture taking function. Recently, some foldable digital cameras have been developed and introduced. They employ conventional hinges to connect the LCD panel to the camera body. When not in use, the LCD panel and lens unit may be folded and covered under protection. However, the conventional hinge structure allows only the LCD panel to turn against the camera body, but no relative turning movement between the LCD panel and camera body. There is a limitation for the turning angle. As a result, it reduces flexibility and the camera cannot take picture at some angles. For instance, to do self-picture taking, or to take pictures at a very large or small angle will cause substantial inconvenience.

SUMMARY OF THE INVENTION

The primary object of this invention is to provide a hinge structure for connecting electronic devices that consist of two elements, such as to couple the LCD panel with the camera body of a digital camera. Through the linkage motion of a gear unit, when the display panel is turned, the gear unit will be driven to turn the camera body in the opposite direction. And the angle between the LCD panel and camera body may range from 0 to 360 degrees, and allow for unlimited picture taking angles.

The hinge structure according to this invention comprises a pivot unit, a gear unit, a elastic member and a pair of cranks. The gear unit is located in a housing chamber of the pivot unit and has two rolling gears disposed at two outer sides. Each rolling gear has a bulged section extending outside the pivot unit and an insert hole located at the axis. The bulged section has a plurality of positioning notches. On the inner sides between the rolling gears, there are two smaller alignment gears engaged with each other and also engaged respectively with the rolling gears located on the outer side, such that turning one of the rolling gears on the outer side will drive another rolling gear turning in the opposite direction. The elastic member is located on the outside of the pivot unit and has two sides which each have an elastic projection located thereon to engage with the positioning notch of the rolling gear. The crank has one end fastened to the camera body or display panel and the other end disposed in the insert hole of the rolling gear. If one turns the camera body or display panel, the rolling gear will be driven to turn the display panel or camera body in the opposite direction through the elastic projection, which is stationary and mounted on the notch of the rolling gear, thereby changing the angle between the display panel and camera body. This angle may range from 0 to 360 degrees, with unlimited picturing taking angles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and of the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
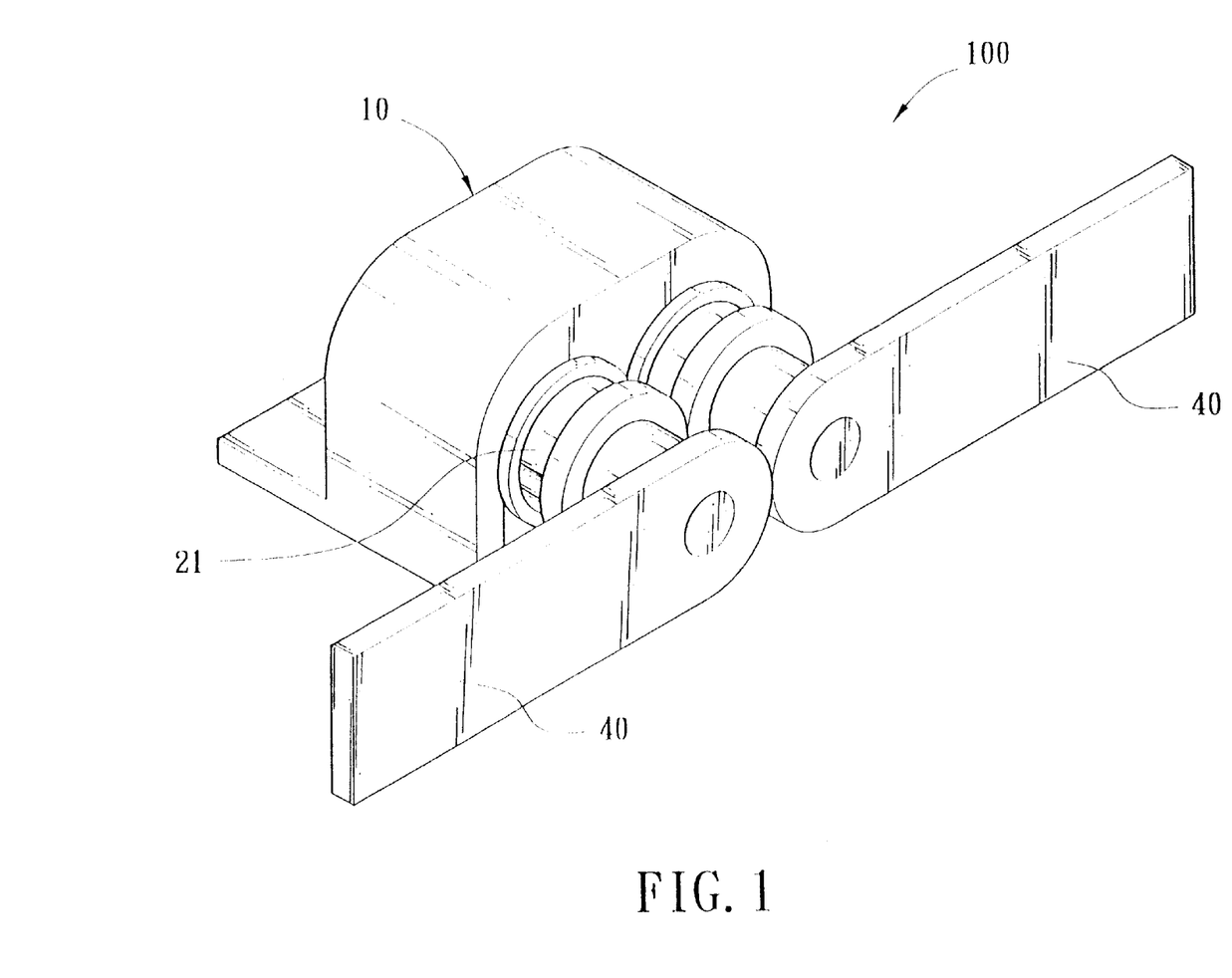
FIG. 1 is a schematic view of a first embodiment of this invention.

Referring to FIG. 1 for one embodiment of this invention, the hinge structure 100 aims at connecting an electronic device which consists of two elements. It comprises a pivot unit 10, rolling gears 21 and a pair of cranks 40. The pivot unit 10 has a housing chamber for holding the rolling gears 21. The cranks 40 engage with the rolling gears 21 and move synchronously therewith, and also fasten to the two elements of the electronic device. Thereby when one element of the electronic device is turned, through the cranks 40, the rolling gears 21 will be driven to turn the other element in the opposite direction.

Figure 2:
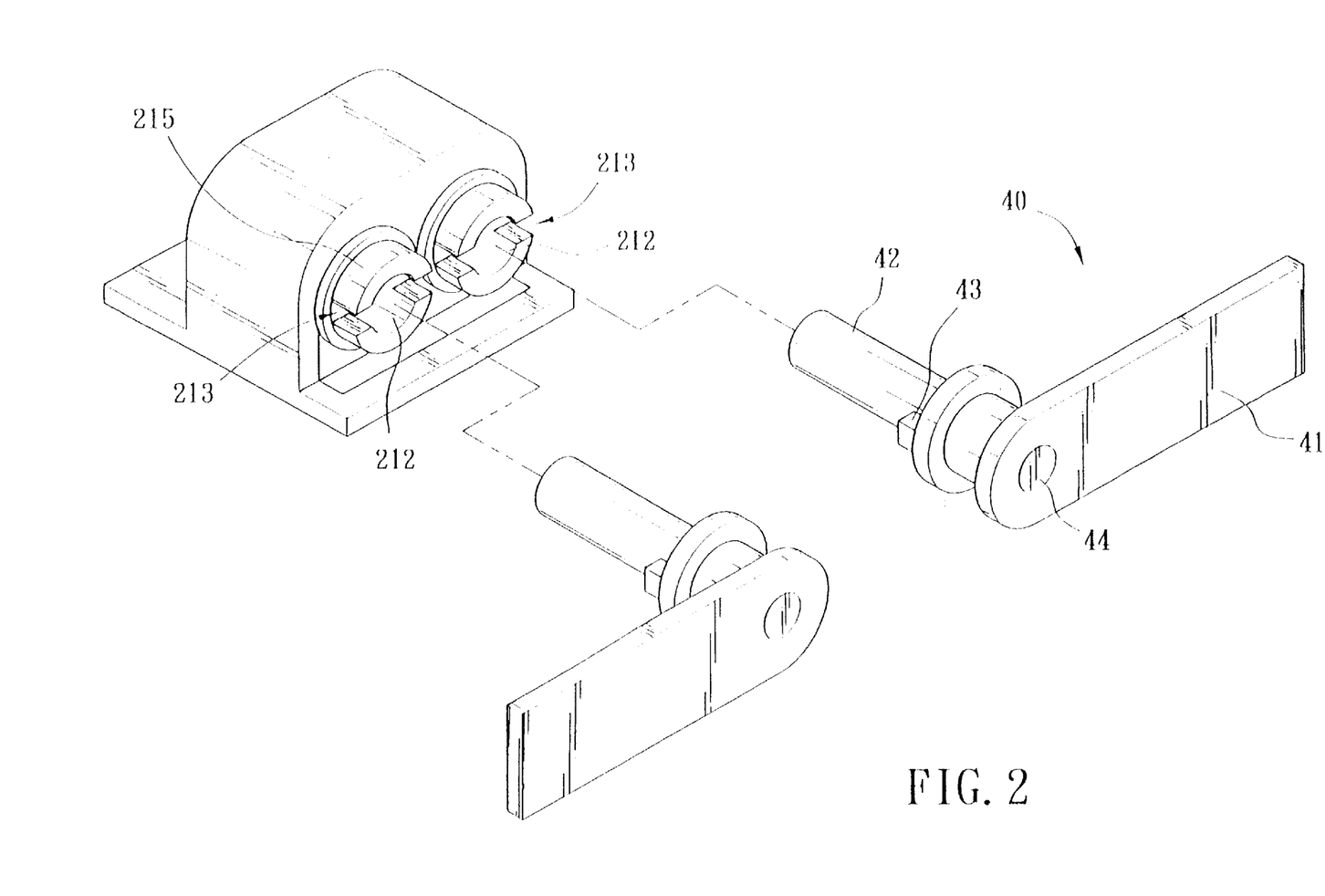
FIG. 2 is a partly exploded view of the first embodiment of this invention.

Referring to FIG. 2, the rolling gears 21 are located in the pivot unit 10. Each rolling gear 21 is a hollow member and has a hollow insert hole 212 at the axis. The cranks 40 are a pair of substantially L-shaped members, each with one end forming a lever 41 and the other end forming an attachment shaft 42. The attachment shaft 42 is located in the insert hole 212 and may move synchronously with the rolling gear 21. The lever 41 has one end fastened to the attachment shaft 42 and the other end fastened to the element of the electronic device. The attachment shaft 42 has a fixing rib 43 extended in a radial direction for engaging with a slot 213 formed in a bulged section 215 of the rolling gear 21 held in the pivot unit 10, to enable the attachment shaft 42 fastened to the gear unit 20 to turn with the gear unit 20. The rolling gears 21 are designed and constructed in such a way that when one of the cranks 40 turns, it will drive and turn the rolling gears 21 and consequently drive another crank 40 turning in the opposite direction.

Figure 3:
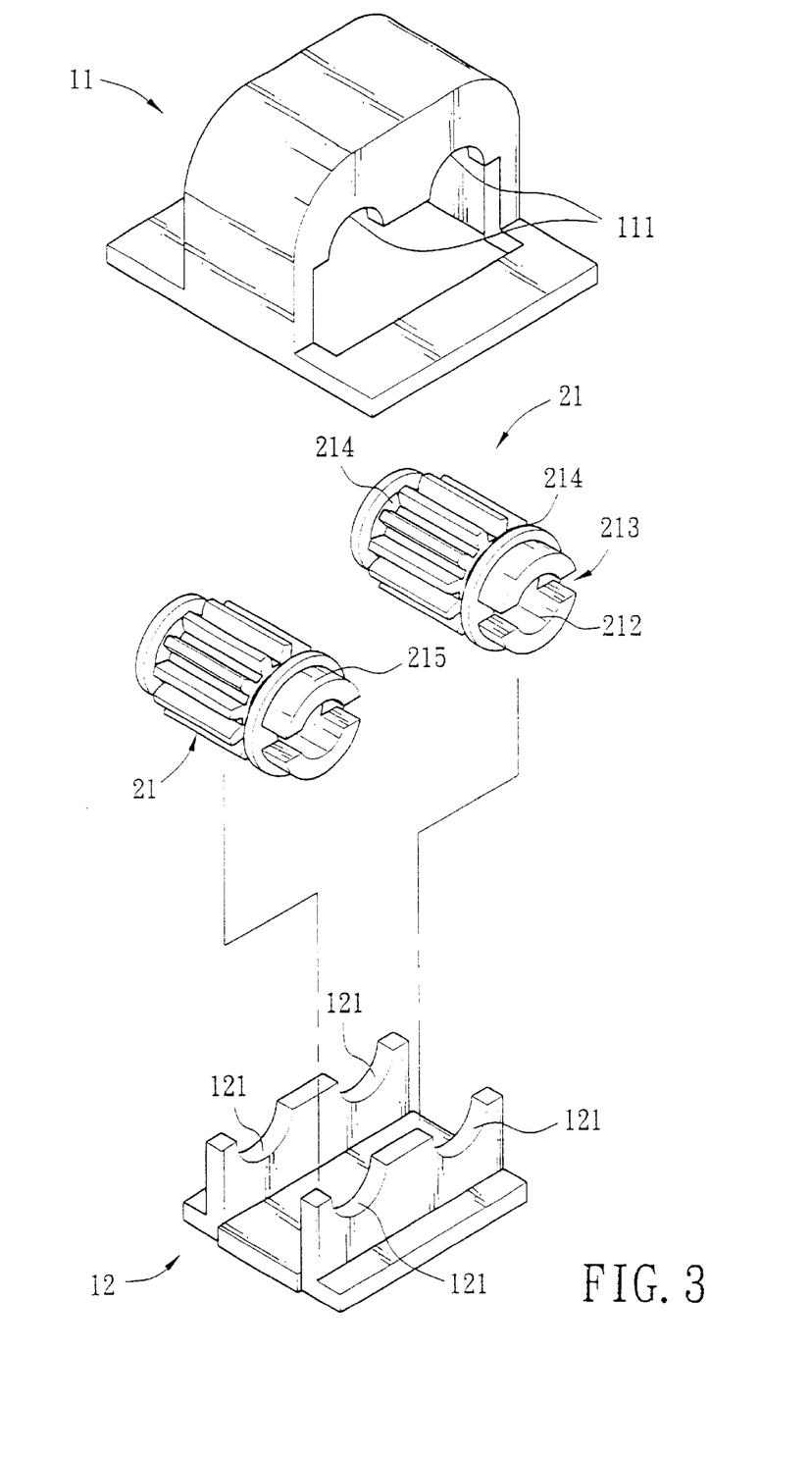
FIG. 3 is an exploded view of the first embodiment of this invention.

Referring to FIG. 3, the pivot unit 10 includes a top cover 11 and a base cover 12. The top cover 11 has a transverse housing chamber. The housing chamber has two sides each having an upper portion extended downwards to form a protrusive edge. The protrusive edge has two upper semi-circle openings 111 facing downward. The centers of the upper semi-circle openings 111 at the two sides are located on a straight line. The base cover 12 is housed in the top cover 11 and has two sides extended upwards to form another protrusive edge, which has two lower semi-circle openings 121 facing upward to mate respectively with the upper semi-circle openings 111 of the top cover 11.

The rolling gear 21 has a front and a rear end, which form a shrunk neck section 214 for engaging with the circular opening formed by coupling the upper and lower semicircle opening 111 and 121 of the top cover 11 and base cover 12. The slots 213 at two sides of the insert hole 212 engage with the cranks 40 for transmission, and the two rolling gears 21 engage with each other (shown in FIG. 4). When one of the rolling gears 21 is turned, the other rolling gear 21 will be driven and turned in the opposite direction (only one turning direction is shown in the drawing).

Figure 5:
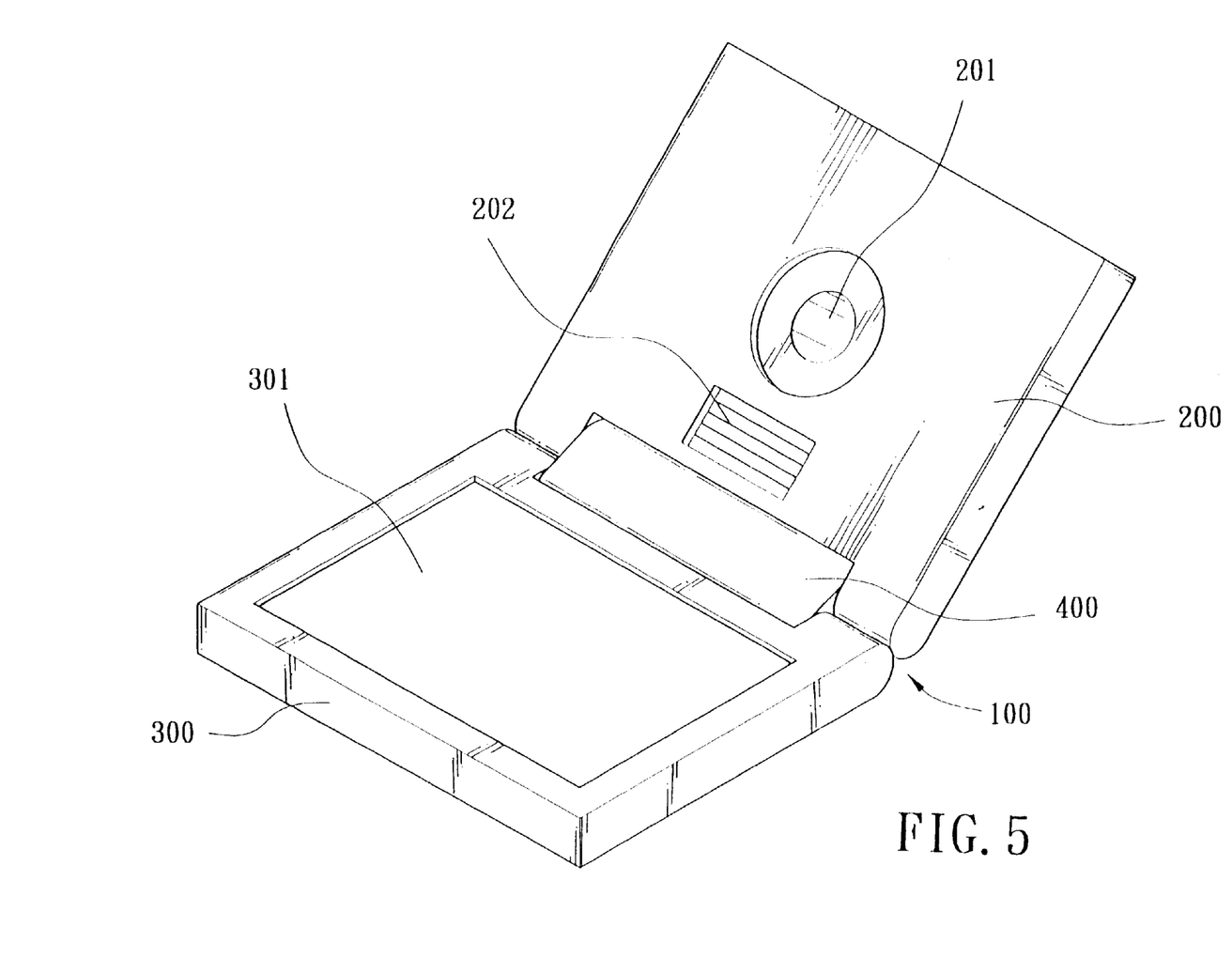
FIG. 5 is a schematic view of this invention adapted in a digital camera.
Figure 6A:
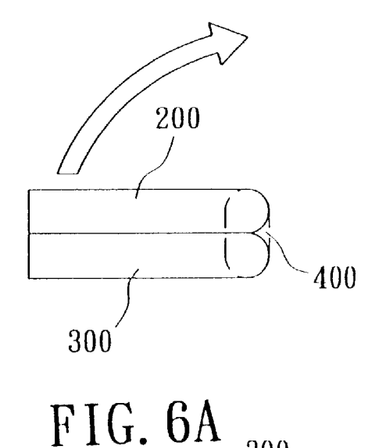
FIGS. 6A, 6B, 6C, 6D and 6E are a schematic view of this invention in use.
Figure 6B:
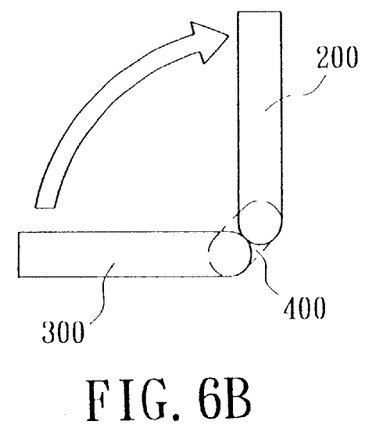
Figure 6C:
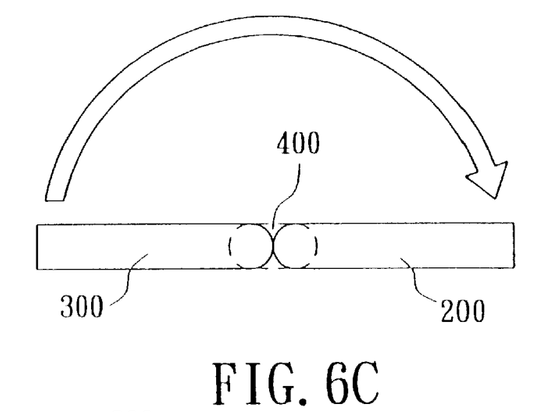
Figure 6D:
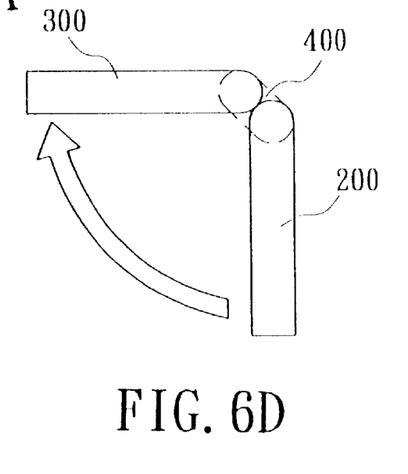
Figure 6E:
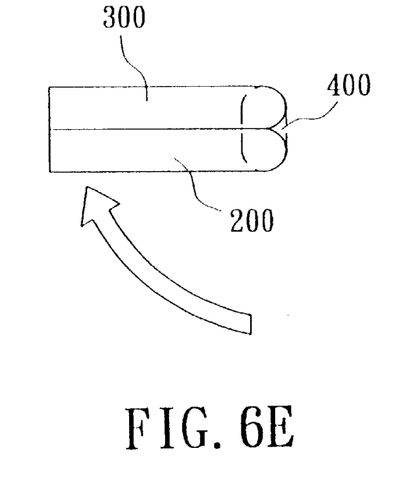

This invention may be adapted for use with a digital camera, as shown in FIG. 5. The digital camera has a second case 300 for containing a LCD 301 and a first case 200 for containing a lens unit 201 and a strobe unit 202, and through a hole 44 located at the center of the attachment shaft 42 of the crank 40, it can further engage with a middle case 400.

When the camera is not in use and is being stored, turn the second case 300 or the first case 200 to make the two cases turn and fold toward each other until reaching a closed position. The lens unit 201 and LCD ,01 will then be protected. When the camera is in use, turn and extend the second case 300 or first case 200 to an angle desired for taking pictures. The design of this invention allows the second case 300 to turn relatively against the first case 200 in a range from 0 to 360 degrees, as shown in FIGS. 6A to 6E. Turning the first case 200 will drive the rolling gears 21 of the hinge unit 100, and consequently turn the second case 300 in the opposite direction, until the first case 200 and second case 300 extend to any desired angle. Hence, there is no angle limitation for picture taking, and users may take self-pictures or any picture with a very small or very large angle.

Figure 7:
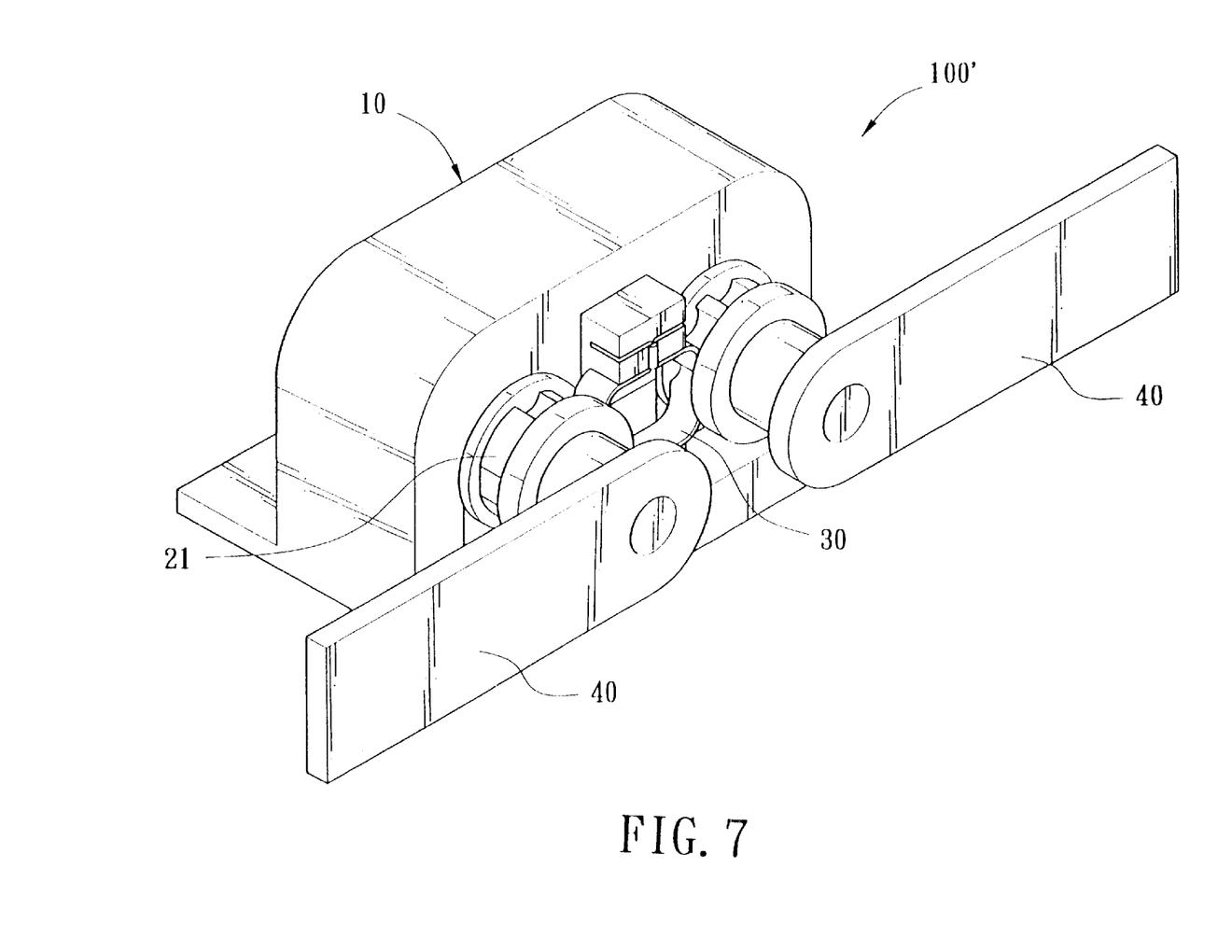
FIG. 7 is a schematic view of a second embodiment of this invention.

FIG. 7 shows a second embodiment of this invention. The hinge unit 100' is for connecting an electronic device which consists of two elements. It includes a pivot unit 10, rolling gears 21, a elastic member 30 and a pair of cranks 40. The pivot unit 10 has a housing chamber for holding the rolling gears 21. The cranks 40 engage with the rolling gears 21 and move therewith synchronously, and also fasten to the two elements of the electronic device. Thereby when one element of the electronic device is turned, through the cranks 40, the rolling gears 21 will be driven to turn the other element in the opposite direction. The elastic member 30 has positioning function and is designed to match the notches 211 of the rolling gears 21 to enable the rolling gears 21 be positioned at any desired relative angle, and consequently to position the two elements at different angles.

Figure 8:
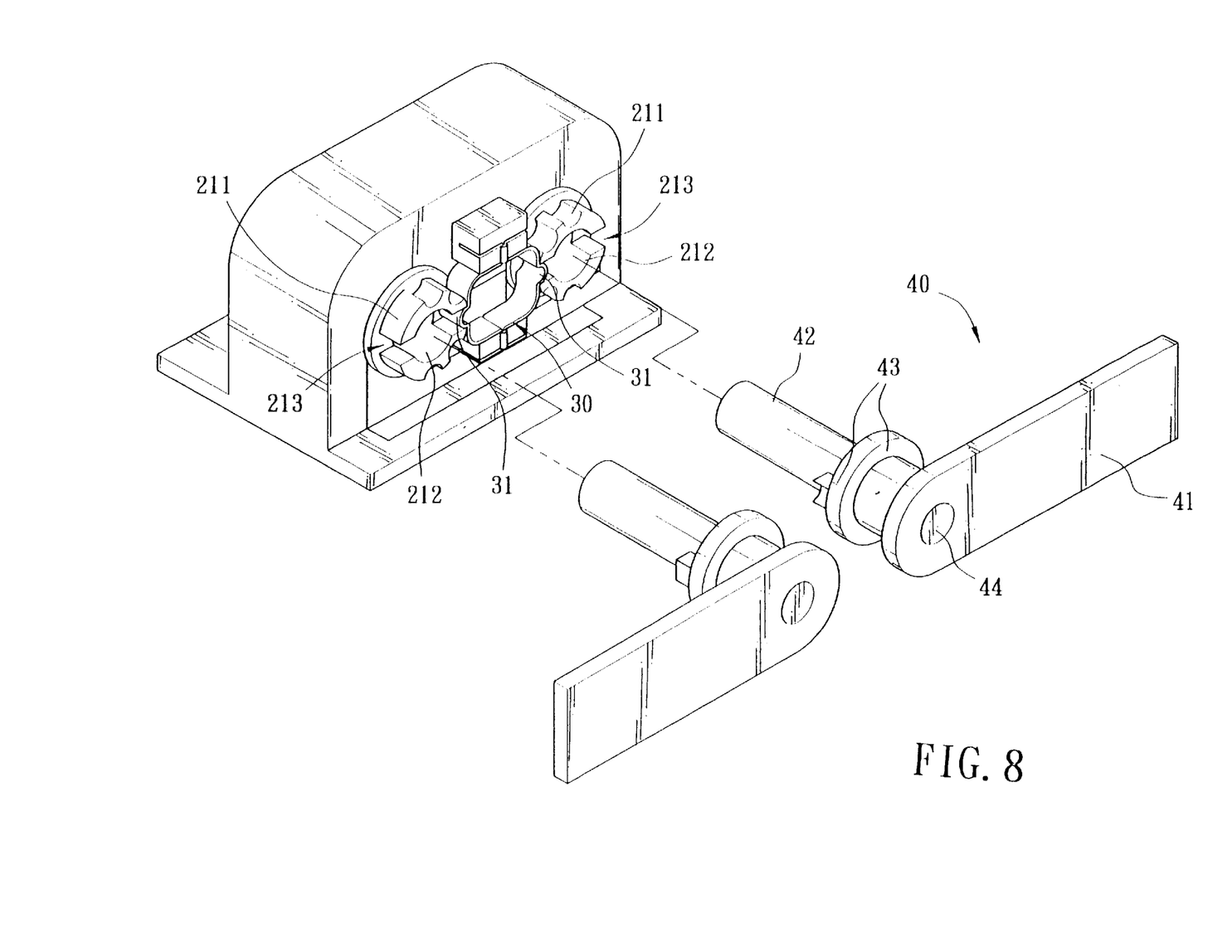
FIG. 8 is a partly exploded view of the second embodiment of this invention.

Referring to FIG. 8, the rolling gears 21 are located in the pivot unit 10. Each rolling gear 21 is a hollow member having a hollow axial insert hole 212 and a bulged section 215 extended outside the pivot unit 10. The bulged section 215 has a plurality of notches 211 for engaging with an elastic projection 31 located on the elastic member 30, to thereby position the cranks 40 engaged with the rolling gears 21. The cranks 40 are a pair of substantially L-shaped members, each with one end forming a lever 41 and the other end forming an attachment shaft 42. The attachment shaft 42 is housed in the insert hole 212 and may move synchronously with the rolling gears 21. The lever 41 has one end fastened to the attachment shaft 42 and the other end fastened to the element of the electronic device. The attachment shaft 42 has a fixing rib 43 extended in a radial direction for engaging with a slot 213 formed in the bulged section 215 to turn with the rolling gears 21. The rolling gears 21 are designed and constructed in such a way that when one of the cranks 40 turns, it will drive and turn the rolling gears 21 and consequently drive the other crank 40 to turn in the opposite direction.

Figure 9:
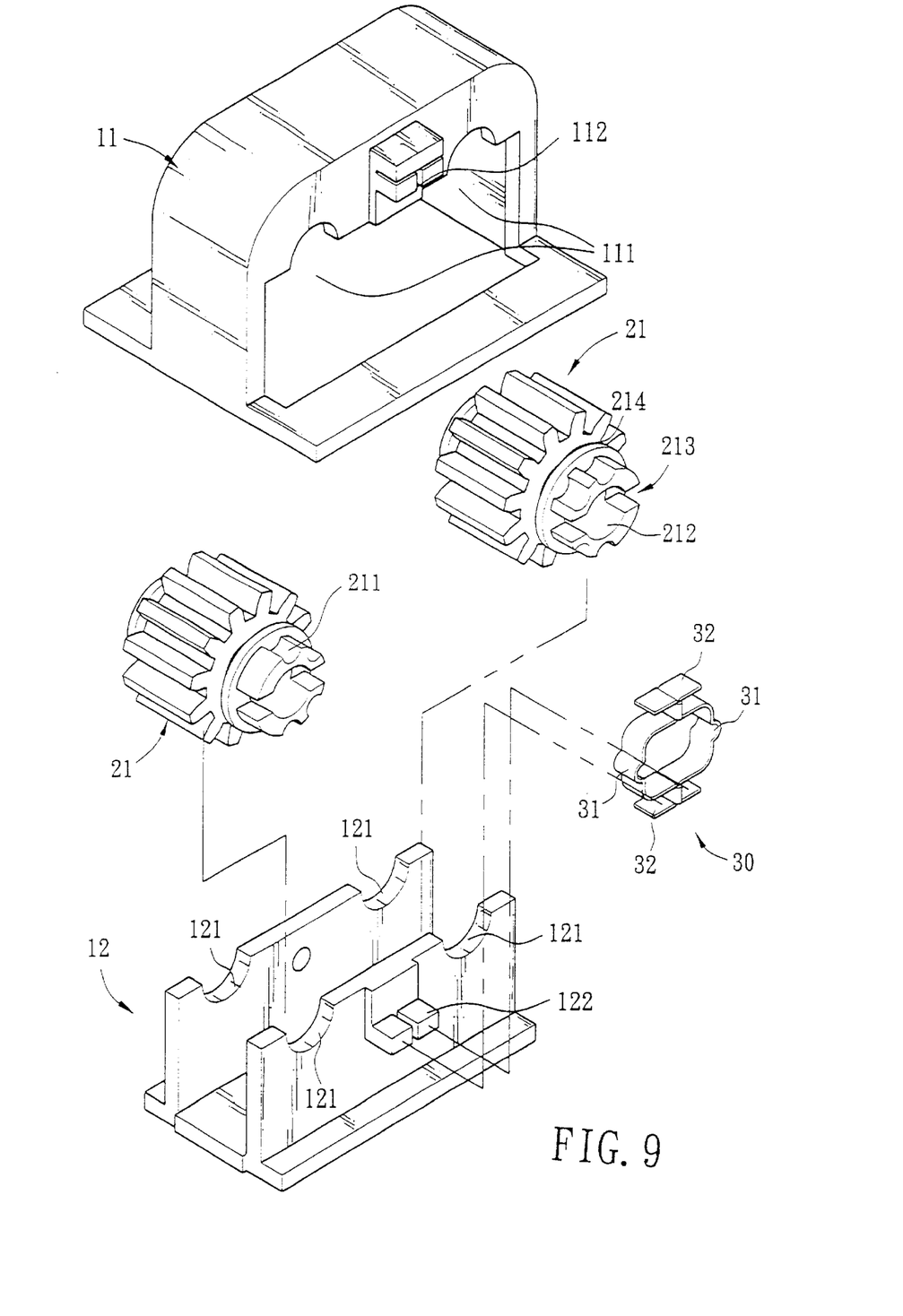
FIG. 9 is an exploded view of the second embodiment of this invention.

Referring to FIG. 9, the pivot unit includes a top cover 11 and a base cover 12. The top cover 11 has a transverse housing chamber. The housing chamber has two sides each having an upper portion extended downwards to form a protrusive edge. The protrusive edge has two upper semi-circle openings 111 facing downward. The centers of the upper semi-circle openings 111 at the two sides are located on a straight line. The base cover 12 is housed in the top cover 11 and has two sides extended upwards to form another protrusive edge, which has two lower semi-circle openings 121 facing upward to mate respectively with the upper semi-circle openings 111 of the top cover 11. The top cover 11 and base cover 12 have respectively a protrusive upper positioning slot 112 and a lower positioning slot 122, which correspond to each other for fastening the elastic member 30 to the pivot unit 10.

Figure 4:
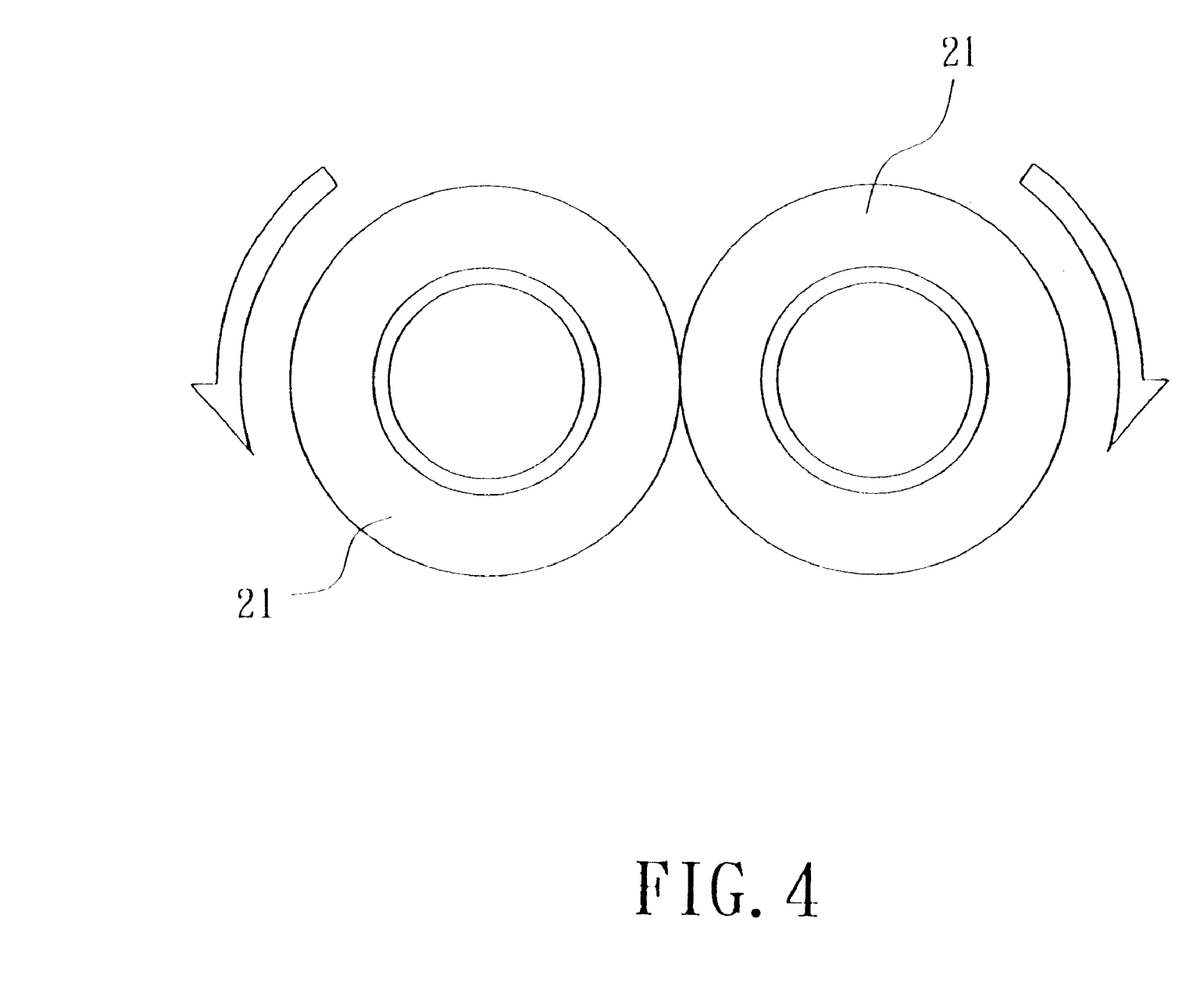
FIG. 4 is a schematic view of the gear unit of the first embodiment of this invention.

The rolling gear 21 has a front and a rear end, which form a shrunk neck section 214 for engaging in the circular opening formed by the upper and lower semi-circle opening 111 and 112 of the top cover 11 and base cover 12. As the radial slots 213 at two sides of the insert hole 212 engage with the cranks 40 for transmission, and the two rolling gears 21 are engaged (as shown in FIG. 4). When one of the rolling gears 21 is turned, the other rolling gear 21 will be driven and turned in the opposite direction (only one turning direction is shown in the drawing).

The elastic member 30 has a positioning extension 32 located respectively at the upper and lower end thereof for wedging into the upper positioning slot 112 of the top cover 10 and the lower positioning slot 122 of the base cover 12, to thereby fasten the elastic member 30 to the pivot unit 10. The elastic member 30 has two sides, each with an elastic projection 31 for engaging with the notch 211 of the rolling gears 21, to thereby position the rolling gears 21 at the angle and position where the notch 211 is located, and consequently to position the cranks 40.

This embodiment may be adapted for use with a digital camera, as shown in FIGS. 5 and 6. As depicted above, the first case 200 and second case 300 of the digital camera may be extended to any desired angle. Hence, there is no angle limitation for picture taking, and users may take self-pictures or any picture with a very small or large desired angle.

Figure 10:
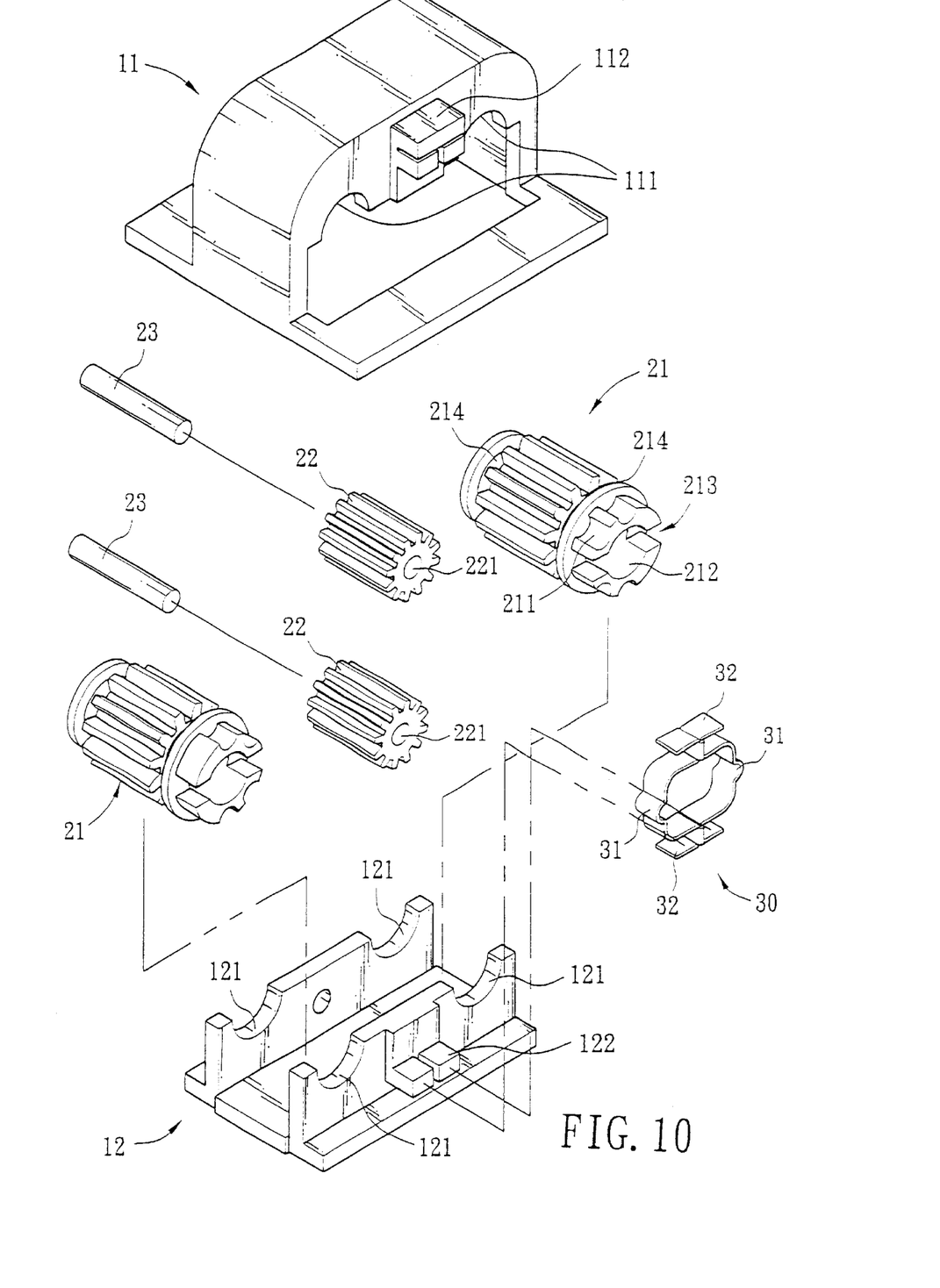
FIG. 10 is an exploded view of a third embodiment of this invention.
Figure 11:
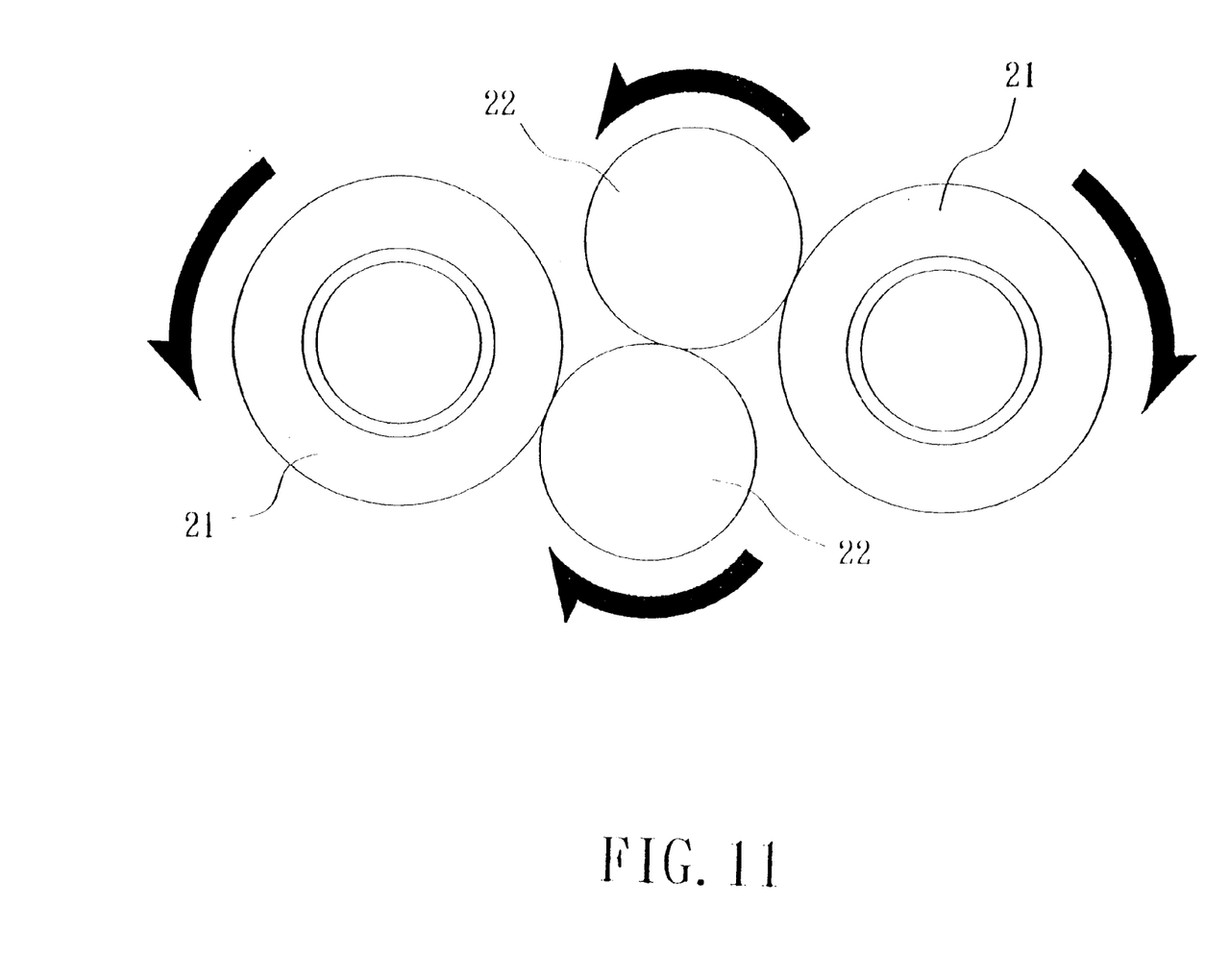
FIG. 11 is a schematic view of the gear unit of the third embodiment of this invention.

FIG. 10 illustrates a third embodiment of this invention, which mainly involves adding a pair of alignment gears 22 to the second embodiment. The alignment gears 22 have respectively a through hole 221 formed therein for engaging with a shaft 23, which holds the alignment gears 22 securely and allows the alignment gears to engage with each other. The alignment gears 22 further engage with one rolling gear 21. Referring to FIG. 11, when one of the rolling gears 21 is turned, it will drive the alignment gears 22 and consequently drive another rolling gear 21 to turn in the opposite direction (only one turning direction is shown in the drawing).

This embodiment may be adapted for use with a digital camera, as shown in FIGS. 5 and 6. As depicted above, the first case 200 and second case 300 of the digital camera may be extended to any desired angle. Hence, there is no angle limitation for picture taking, and users may take self-pictures or any picture with a very small or large desired angle.

In summary, this invention may achieve the following effects:

This invention provides a hinge structure for connecting an electronic device consisting of two elements, such as a digital camera, and especially for connecting the camera body and the display panel. The camera body and display panel may be turned or folded against each other. Through the linkage movement of the gear unit, when the display panel is turned, the gear unit will be driven and turned, and consequently drive the camera body to turn in the opposite direction. The angel between the display panel and camera body may range from 0 to 360 degrees to allow picture taking without angle limitation.

While the preferred embodiments of this invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of this invention.

What is claimed is:

1. A hinge structure for connecting two cases of a digital camera comprising:
   a pivot unit having a housing chamber;
   a pair of gear units including a pair of rolling gears located in the housing chamber and meshed with each other, each rolling gear having a bulged section extended outside the pivot unit, and a pair of cranks fastened respectively to the two cases of the digital camera and engaged respectively with the rolling gears for moving synchronously therewith such that turning one of the cases in one direction will drive another of the cases in an opposite direction through the rolling gears, the bulged section having a plurality of notches; and
   an elastic member fastened to the pivot unit having two elastic projections adjacent the bulged sections, each elastic projection engaging the notches of the bulged sections.

2. The hinge structure of claim 1, wherein the pivot unit includes:
   a top cover having a holding chamber which has two top extended edges located at two sides thereof, each top extended edge having a plurality of upper curved openings corresponding to one another; and
   a base cover located in the holding chamber having two base extended edges located at two sides thereof, each base extended edge having a plurality of lower curved openings corresponding to the upper curved openings of the top cover.

3. The hinge structure of claim 2, wherein each of the rolling gears have two shrunk neck sections for engaging respectively with the curved openings of the pivot unit.

4. The hinge structure of claim 2, wherein the top cover and the base cover have respectively a protrusive upper positioning slot and a protrusive lower positioning slot for fastening the elastic member.

5. The hinge structure of claim 1, wherein the rolling gears have respectively an insert hole at the axis thereof.

6. The hinge structure of claim 5, wherein the crank includes:
   an attachment shaft housed in the insert hole and movable synchronously with the rolling gears; and
   a lever having one end fastened to the attachment shaft and another end fastened to one of the cases of the digital camera.

7. The hinge structure of claim 6, wherein the bulged section of the rolling gear has a radial slot, and the attachment shaft of the crank having a radial fixing rib for engaging with the radial slot.

8. A hinge structure for connecting two cases of a digital camera comprising:
   a pivot unit having a housing chamber;
   a pair of gear units including a pair of rolling gears located in the housing chamber and meshed with each other, each rolling gear having a bulged section extended outside the pivot unit, and a pair of cranks fastened respectively to the two cases of the digital camera and engaged respectively with the rolling gears for moving synchronously therewith such that turning one of the cases in one direction will drive another of the cases in an opposite direction through the rolling gears, the bulged section having a plurality of notches;
   a pair of alignment gears located between the rolling gears and meshed with the rolling gears to drive the rolling gears turning in opposite directions; and
   an elastic member fastened to the pivot unit having two elastic projections adjacent the bulged sections, each elastic projection engaging with the notches of the bulged sections for positioning an angle of the two cases of the digital camera relative to the notches.

9. The hinge structure of claim 8, wherein the pivot unit includes:
   a top cover having a holding chamber which has two top extended edges located at two sides thereof, each top extended edge having a plurality of upper curved openings corresponding to one another; and a base cover located in the holding chamber having two base extended edges located at two sides thereof, each base extended edge having a plurality of lower curved openings corresponding to the upper curved openings of the top cover.

10. The hinge structure of claim 9, wherein each of the rolling gears have two shrunk neck sections for engaging respectively with the curved openings of the pivot unit.

11. The hinge structure of claim 9, wherein the top cover and the base cover have respectively a protrusive upper positioning slot and a protrusive lower positioning slot for fastening the elastic member.

12. The hinge structure of claim 8, wherein the rolling gears have respectively an insert hole at the axis thereof.

13. The hinge structure of claim 8, wherein the crank includes:

an attachment shaft housed in the insert hole and movable synchronously with the rolling gears; and a lever having one end fastened to the attachment shaft and another end fastened to one of the cases of the digital camera.

14. The hinge structure of claim 13, wherein the bulged section of the rolling gear has a radial slot, and the attachment shaft of the crank having a radial fixing rib for engaging with the radial slot.

15. The hinge structure of claim 8, wherein the alignment gears have a smaller radius than the rolling gears.

* * * * *